(12) United States Patent
Singleton, IV et al.

(10) Patent No.: US 11,108,845 B2
(45) Date of Patent: *Aug. 31, 2021

(54) RENDERING A WEB APPLICATION IN A CLOUD SERVICE

(71) Applicant: Citrix Systems, Inc., Fort Lauderdale, FL (US)

(72) Inventors: Leo C. Singleton, IV, Fort Lauderdale, FL (US); Jason Willoughby, Fort Lauderdale, FL (US); Steven N. Short, Fort Lauderdale, FL (US); Bala Swaminathan, Parkland, FL (US); Jitendra Deshpande, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/878,251

(22) Filed: May 19, 2020

(65) Prior Publication Data
US 2020/0280600 A1     Sep. 3, 2020

Related U.S. Application Data

(63) Continuation of application No. 15/820,530, filed on Nov. 22, 2017, now Pat. No. 10,666,706.

(51) Int. Cl.
*G06F 3/0483* (2013.01)
*H04L 29/08* (2006.01)
*H04L 12/24* (2006.01)

(52) U.S. Cl.
CPC .......... *H04L 67/025* (2013.01); *G06F 3/0483* (2013.01); *H04L 41/0893* (2013.01); *H04L 41/22* (2013.01); *H04L 41/5051* (2013.01); *H04L 67/141* (2013.01); *H04L 67/36* (2013.01); *H04L 41/5083* (2013.01)

(58) Field of Classification Search
CPC ..... H04L 67/025; H04L 67/141; H04L 67/36; H04L 41/0893; H04L 41/22; H04L 41/5051; H04L 41/5083; G06F 3/0483
See application file for complete search history.

(56) References Cited

U.S. PATENT DOCUMENTS

| | | | |
|---|---|---|---|
| 9,311,457 B1 | 4/2016 | Thirthala et al. | |
| 10,037,424 B1 | 7/2018 | Guenther | |
| 10,733,260 B1 * | 8/2020 | Sahl | .................... G06F 9/44536 |
| 2010/0082813 A1 | 4/2010 | Li et al. | |
| 2012/0317236 A1 | 12/2012 | Abdo et al. | |

(Continued)

*Primary Examiner* — Andrew T Chiusano
(74) *Attorney, Agent, or Firm* — Banner & Witcoff, Ltd.

(57) ABSTRACT

Methods, devices, and computer-readable media for providing access to a web-based application from a remote computing device having a software environment that is incompatible with the web application are presented. In some embodiments, a virtual server may receive from a client device, a request to execute a web application, where at least a first portion of the web application may be hosted by the virtual server and a second portion of the web application may be hosted by a second server. In response to the request by the client device, the web application may be executed at the virtual server. Then a user interface of the web application may be sent to the client device to be presented in a local browser at the client device.

20 Claims, 11 Drawing Sheets

(56) References Cited

U.S. PATENT DOCUMENTS

| | | |
|---|---|---|
| 2014/0108496 A1 | 4/2014 | Heller et al. |
| 2015/0121193 A1* | 4/2015 | Beveridge ............... G06F 40/14 715/234 |
| 2015/0161277 A1 | 6/2015 | Heller et al. |
| 2016/0004628 A1 | 1/2016 | Gugri |
| 2017/0339250 A1 | 11/2017 | Momchilov et al. |
| 2021/0034694 A1* | 2/2021 | Peter .................... G06F 16/972 |

* cited by examiner

RENDERING A WEB APPLICATION IN A CLOUD SERVICE

CROSS-REFERENCE TO RELATED APPLICATIONS

This application is a continuation of and claims priority to U.S. patent application Ser. No. 15/820,530, now U.S. patent Ser. No. 10/666,706, filed on Nov. 22, 2017, issued on May 26, 2020, and entitled "Rendering a Web Application in a Cloud Service," the contents of which are incorporated herein, by reference, in their entirety.

FIELD

Aspects of the disclosure relate generally to computer hardware and software. In particular, one or more aspects of the disclosure relate to computer hardware and software for hosting a web application in a cloud service.

BACKGROUND

Users are increasingly using mobile and other remote computing devices to access software and services hosted remotely—such as those provided by a user's employer or those which the user has subscribed to from an independent software vendor (ISV). Such remote users require the ability to access these remote services to perform a variety of functions, such as sending and receiving email, managing calendars and tasks, creating and viewing content, executing applications, etc. As such remote access has become increasingly important for organizations and their users, organizations must find ways to support access to their systems and applications from a variety of disparate hardware and software environments. This presents a technical challenge when, for example, a remote user's software environment is incompatible with the organization's systems and/or applications.

SUMMARY

Aspects of the disclosure provide technical solutions that may address and overcome one or more technical challenges associated with providing access to software and services, from remote computing environments.

In particular, one or more aspects of the disclosure describes providing access to a web-based application ("a web application") from a remote computing device having a software environment that is incompatible with the web application. For example, by implementing one or more aspects of the disclosure, a web application may be "hosted" in a cloud service environment and may be accessed by a remote user via a virtual browser also hosted in the cloud service environment. In this way, a remote user may seamlessly access, via a virtual environment, a web application that is incompatible with the remote user's native software environment.

In accordance with an aspect of the disclosure, a virtual server may receive from a client device, a request to execute a web application, where at least a first portion of the web application may be hosted by the virtual server and a second portion of the web application may be hosted by a second server. In response to the request by the client device, the web application may be executed at the virtual server. Then a user interface of the web application may be sent to the client device.

In accordance with another aspect of the disclosure, a server having a processor, a communication interface couple to the processor, and a memory storing a browser application and at least a first portion of a web application, may have the processor configured to receive, from a client device, via the communication interface, a request to execute the web application. In response to the request from the client device, the processor may be configured to execute the web application. Then the processor may be configured to send the user interface of the web application to the client device, via the communication interface. A second portion of the web application may be hosted by a second server.

In accordance with yet another aspect of the disclosure, instructions may be stored on a non-transitory, computer-readable storage medium, and the when the instructions are executed by a client device, the instructions configure the client device to output a client browser application for display in a display of the client device. The instructions may further configure the client device to receive a first request to execute a web application, via the client browser application. The instructions may further configure the client device to send, to a virtual server and in response to the first request, a second request to execute a virtualized web application corresponding to the requested web application. The instructions may further configure the client device to receive, from the virtual server and in response to the second request, a user interface of the virtualized web application. The instructions may further configure the client device to output the user interface of the virtualized web application, to the client browser application. At least a first portion of the virtualized web application may be hosted by the virtual server and a second portion of the virtualized web application may be hosted by a second server.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features and elements, and in which.

DETAILED DESCRIPTION

In the following description, reference is made to the accompanying drawings identified above and which form a part hereof, and in which is shown, by way of illustration, various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising", and variations thereof, is meant to encompass the items listed thereafter and equivalents thereof, as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture.

Computer software, hardware, and networks, described herein, may be utilized in a variety of different system environments, including standalone, networked, remote-access (aka, remote desktop), virtualized, and/or cloud-based environments, among others.

Figure 1:
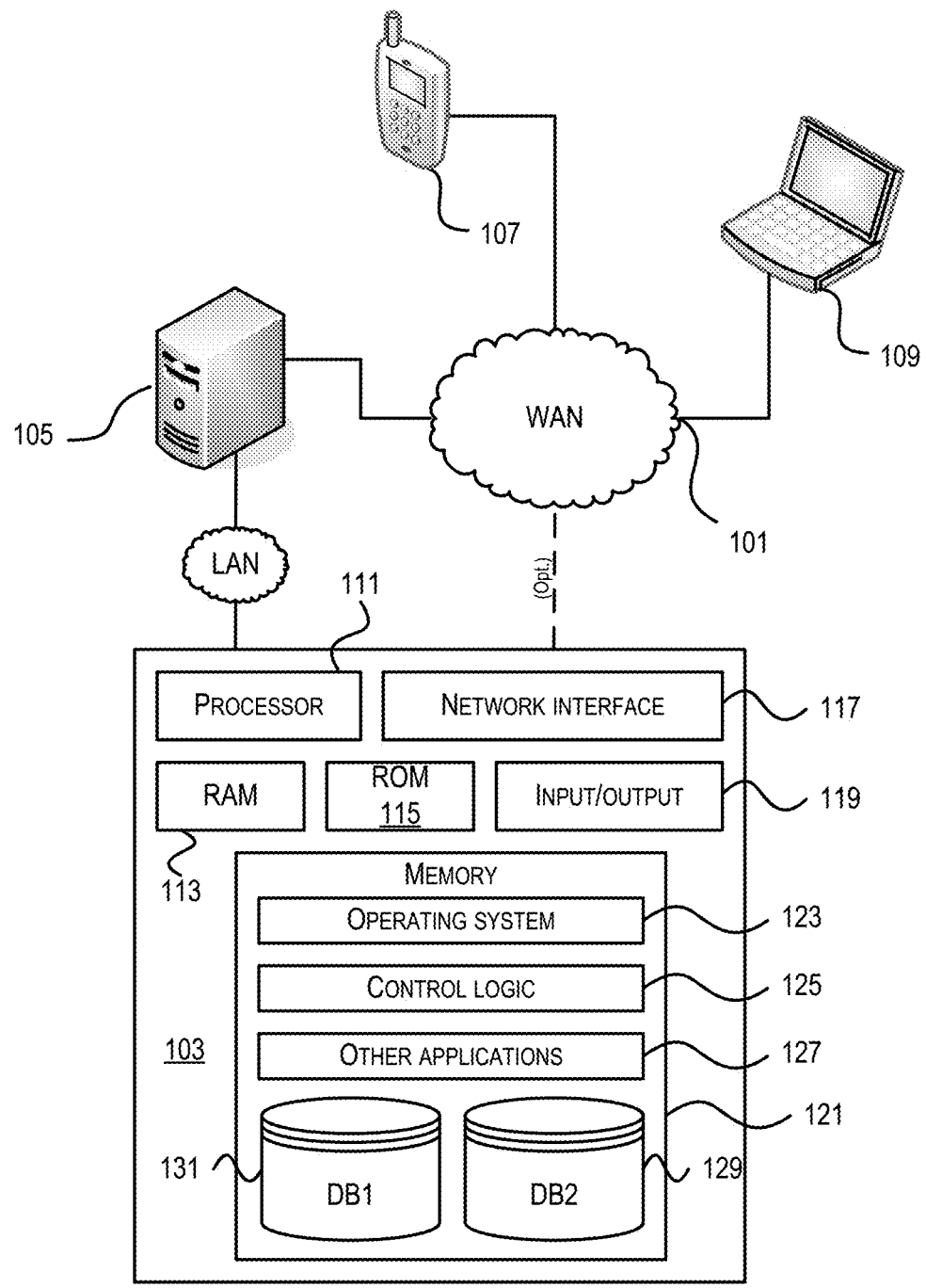
FIG. 1 depicts an illustrative computer system architecture that may be used in accordance with one or more illustrative aspects described herein.

FIG. 1 depicts an illustrative computer system architecture that may be used in accordance with one or more illustrative aspects described herein.

Referring to FIG. 1, an example of a system architecture and various data processing devices that may be used to implement one or more illustrative aspects described herein in a standalone and/or networked environment is provided. Those of skill in the art will appreciate that the specific network architecture and data processing devices used may vary and are secondary to the functionality that they provide, as further described herein.

Various components and devices of the system, such as data server 103, web server 105, and client computers 107 and 109, may be interconnected via a network 101, such as a wide area network (WAN), e.g., the Internet. Other networks may also, or alternatively, be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. The devices 103, 105, 107, 109 and other devices (not shown) may be connected to one or more of the networks 101 via twisted pair wires, coaxial cable, fiber optics, radio waves, or other communication media. The term "network", as used herein and as depicted in the drawings, refers not only to systems in which remote storage devices are coupled together via one or more communication paths, but also to stand-alone devices that may be coupled, from time to time, to such systems that have storage capability. Consequently, the term "network" includes not only a "physical network", but also a "content network," which is comprised of the data—attributable to a single entity—which resides across all physical networks.

Data server 103 provides overall access, control and administration of databases and control software for performing one or more illustrative aspects described herein. The data server 103 may be connected to web server 105, through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using client computers 107, 109, e.g., using the web browser 105 to connect to the data server 103 via one or more externally exposed web sites hosted by web server 105.

Client computers 107, 109 may be used in concert with data server 103 to access data stored therein, or may be used for other purposes. For example, from client computer 107, a user may access web server 105 using an Internet browser, as is known in the art, or by executing a software application that communicates with web server 105 and/or data server 103 over the network 101 (such as the Internet).

Servers and applications may be combined on the same physical machines, and retain separate virtual or logical addresses, or may reside on separate physical machines. For example, services provided by web server 105 and data server 103 may be combined on a single server. Each device 103, 105, 107, 109 may be any type of known computer, server, or data processing device.

Data server 103, for example, may include a processor 111, random access memory (RAM) 113, read only memory (ROM) 115, network interface 117, input/output (I/O) interface 119 (e.g., keyboard, mouse, display, printer, etc.), and memory 121.

Processor 111 may control overall operation of the data server 103.

I/O interface 119 may include a variety of interface units and drives for reading, writing, displaying, and/or printing data or files.

Memory 121 may store operating system software 123 for controlling overall operation of data server 103, control logic 125 for instructing data server 103 to perform aspects described herein, and other application software 127 providing secondary support and/or other functionality, which may or may not be used in conjunction with aspects described herein. The control logic 125 may also be referred to herein as the data server software 125. Functionality of the data server software 125 may refer to operations or decisions made automatically based on rules coded into the control logic, made manually by a user providing input into the system, and/or a combination of automatic processing based on user input (e.g., queries, data updates, etc.). Memory 121 may also store data used in the performance of one or more aspects described herein, including a first database 131 and a second database 129. In some embodiments, the first database 131 may include the second database 129 (e.g., as a separate table, report, etc.). That is, the information can be stored in a single database, or separated into different logical, virtual, or physical databases, depending on system design.

Devices 105, 107, 109 may have similar or different architecture as described with respect to data server 103. Those of skill in the art will appreciate that the functionality of data server 103 (or devices 105, 107, 109) as described herein may be spread across multiple data processing devices, for example, to distribute processing load across multiple computers, to segregate transactions based on geographic location, user access level, quality of service (QoS), etc.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language, such as (but not limited to) HyperText Markup Language (HTML) or Extensible Markup Language (XML). The computer executable instructions may be stored on a computer-readable medium, such as a nonvolatile storage device. Any suitable computer-readable storage media may be utilized, including hard disks, CD-ROMs, optical storage devices, magnetic storage devices, and/or any combination thereof. In addition, various transmission (non-storage) media representing data or events, as described herein, may be transferred between a source and a destination in the form of electromagnetic waves traveling through signal-conducting media, such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents, such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
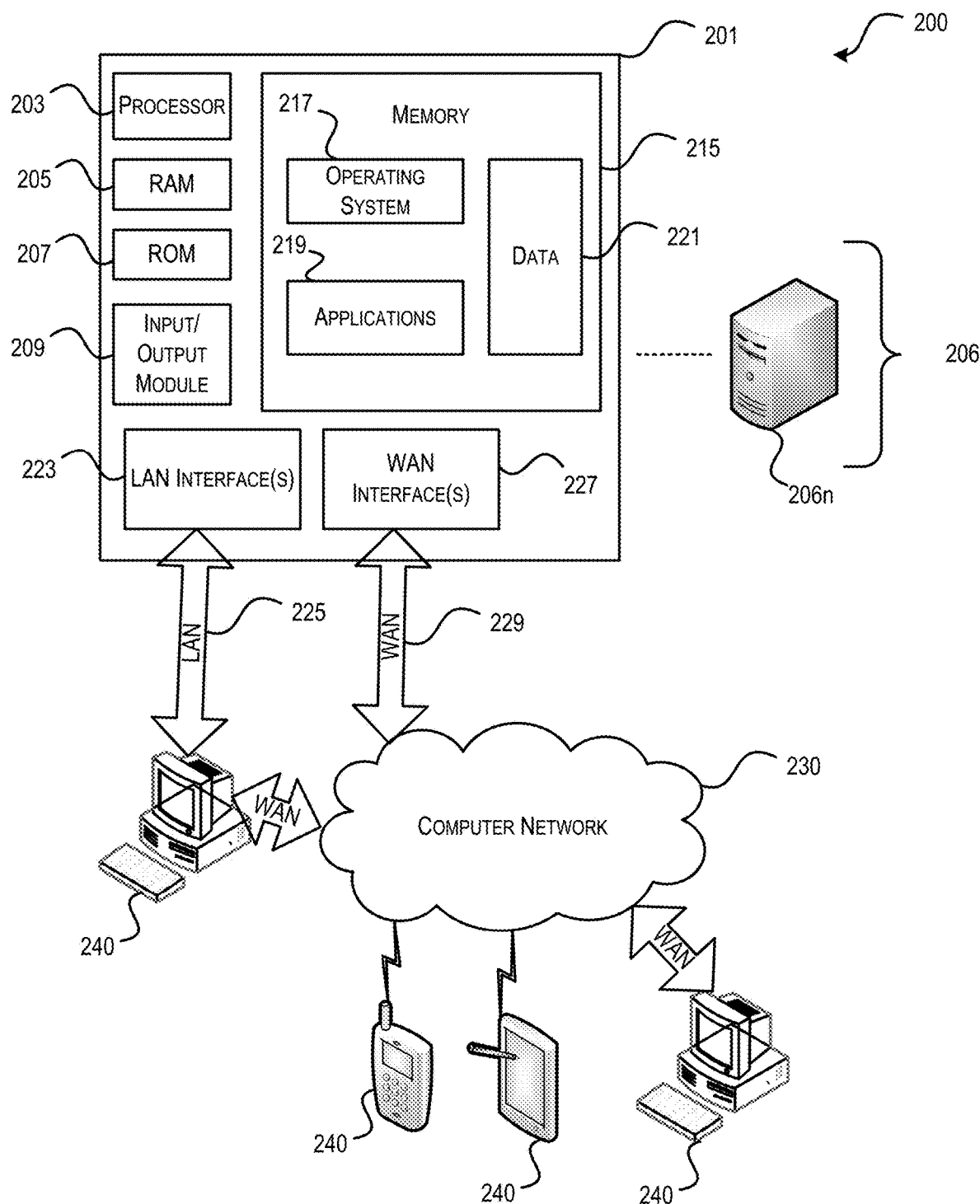
FIG. 2 depicts an illustrative remote-access system architecture that may be used in accordance with one or more illustrative aspects described herein.

FIG. 2 depicts an illustrative remote-access system architecture that may be used in accordance with one or more illustrative aspects described herein.

Referring to FIG. 2, an example of a system architecture, including a computing device 201 in an illustrative computing environment 200, that may be used to implement one or more illustrative aspects described herein is provided. Those of skill in the art will appreciate that the specific network architecture and data processing devices used may vary and are secondary to the functionality that they provide, as further described herein.

Computing device 201 may be used as a server 206a in a single-server or multi-server desktop virtualization system (e.g., a remote access or cloud system) configured to provide virtual machines for client access devices. The computing device 201 may have a processor 203, RAM 205, ROM 207, I/O module 209, memory 215, LAN interface 223, and WAN interface 227.

The processor 203 may control overall operation of the computing device 201 and its associated components.

I/O module 209 may include a mouse, keypad, touch screen, scanner, optical reader, and/or stylus (or other input devices), through which a user of computing device 201 may provide input, and may also include one or more of a speaker for providing audio output and a video display device for providing textual, audiovisual, and/or graphical output.

Memory 215 and/or other storage may store software to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers (PCs), mobile devices, laptop computers, tablets, or servers that include many or all of the elements described above with respect to the data server 103 or the computing device 201. The network connections depicted in FIG. 2 include a LAN 225 and a WAN 229, but may also include other networks. When used in a LAN networking environment, computing device 201 may be connected to the LAN 225 through the LAN interface or adapter 223. When used in a WAN networking environment, computing device 201 may include the WAN interface 227, e.g., a modem, for establishing communications over the WAN 229, such as with a computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, PCs, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the servers 206 and client devices 240. The network appliance may manage client/server connections, and in some cases can load balance client connections amongst a plurality of backend servers 206.

The client devices 240 may, in some embodiments, be referred to as a single client device 240 or a single group of client devices 240, while servers 206 may be referred to as a single server 206 or a single group of servers 206. In one embodiment, a single client device 240 communicates with more than one server 206, while in another embodiment, a single server 206 communicates with more than one client device 240. In yet another embodiment, a single client device 240 communicates with a single server 206.

A client device 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client device 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects, the virtual machine may be managed by a hypervisor executing on a server 206 or a hypervisor executing on a client device 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

The remote computing environment 200 may include more than one server 206a-206n such that the servers 206a-206n are logically grouped together into a server farm 206, for example, in a cloud computing environment. The server farm 206 may include servers 206a-206n that are geographically dispersed while logically grouped together, or servers 206a-206n that are located proximate to each other while logically grouped together. Geographically dispersed servers 206a-206n within a server farm 206 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments, the server farm 206 can include multiple server farms.

In some embodiments, a server farm 206 may include servers 206a-206n that execute a substantially similar type of operating system platform (e.g., WINDOWS, UNIX, LINUX, iOS, ANDROID, SYMBIAN, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) Virtual Private Network (VPN) server, a firewall, a web server, an application server or master application server, a server executing an active directory, or a server executing an application acceleration program that provides firewall functionality, application functionality, or load balancing functionality. Other server types may also be used.

Some embodiments include a first server 206a that receives requests from a client device 240, forwards the request to a second server 206b, and responds to the request generated by the client device 240 with a response from the second server 206b. First server 206a may acquire an enumeration of applications available to the client device 240 as well as address information associated with an application server 206 hosting an application identified within the enumeration of applications. First server 206a can then present a response to the client's request using a web interface, and communicate directly with the client device 240 to provide the client device 240 with access to an identified application. One or more client devices 240 and/or one or more servers 206 may transmit data over computer network 230, e.g., network 101.

Figure 3:
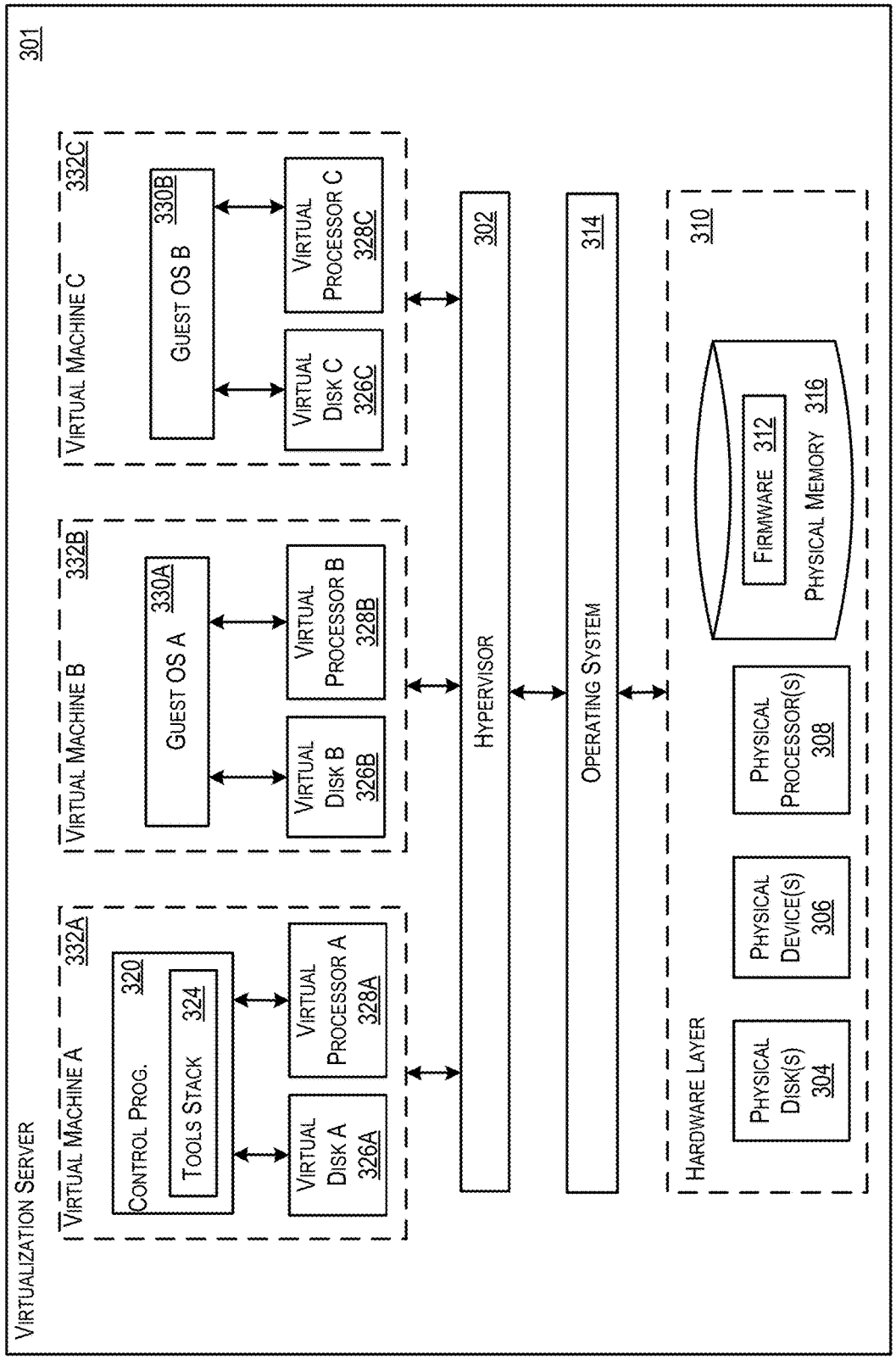
FIG. 3 depicts an illustrative virtualized (hypervisor) system architecture that may be used in accordance with one or more illustrative aspects described herein.

FIG. 3 depicts an illustrative virtualized (hypervisor) system architecture that may be used in accordance with one or more illustrative aspects described herein.

Referring to FIG. 3, an example of a high-level architecture of an illustrative desktop virtualization system, including at least one virtualization server 301, that may be used to implement one or more illustrative aspects described herein is provided. Those of skill in the art will appreciate that the specific network architecture and data processing devices used may vary and are secondary to the functionality that they provide, as further described herein.

As shown, the desktop virtualization system may be a single-server or multi-server system, or a cloud system, including the at least one virtualization server 301, which may be configured to provide virtual desktops and/or virtual applications to one or more client devices 240. As used herein, a desktop refers to a graphical environment or space in which one or more applications may be hosted and/or executed. A desktop may include a graphical shell providing a user interface, for an instance, of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memories 316. Physical components 304, 306, 308, and 316 may include, for example, any of the components described above.

Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, VPN gateway, Dynamic Host Configuration Protocol (DHCP) router, etc.), or any device connected to or communicating with virtualization server 301.

Physical processors 308 may execute programs or executable instructions stored in the physical memory 316. Executing on one or more of the physical processors 308 may be one or more virtual machines 332A-332C (generally virtual machine 332). Each virtual machine 332 may have a virtual disk 326A-326C and a virtual processor 328A-328C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-332C can execute, using a virtual processor 328B-328C, a guest operating system 330A-330B.

Physical memory 316 may include any type of memory. Physical memory 316 may store data, and in some embodiments may store one or more programs, or set of executable instructions. In some embodiments, firmware 312 can be stored within a memory element of the physical memory 316.

Virtualization server 301 may further include an operating system 314 that may be stored in a memory element in the physical memory 316 and executed by one or more of the physical processors 308.

Virtualization server 301 may further include a hypervisor 302 that may be stored in a memory element in the physical memory 316 and executed by one or more of the physical processors 308. In some embodiments, hypervisor 302 may be a program executed by the physical processors 308 to create and manage any number of virtual machines 332, such as virtual machines 332A-332C. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within the operating system 314 executing on the virtualization server 301. Virtual machines then execute at a level above the hypervisor 302. In some embodiments, the Type 2 hypervisor executes within the context of a user's operating system, such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown in FIG. 3, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302 may be used to emulate virtual hardware, partition physical hardware, virtualize physical hardware, and/or execute virtual machines 332 that provide access to computing environments. In still other embodiments, hypervisor 302 controls processor scheduling and memory partitioning for virtual machines 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 executes a hypervisor 302 that creates a virtual machine platform on which guest operating systems 330 may execute. In these embodiments, the virtualization server 301 may be referred to as a host server. An example of such a virtualization server is the XENSERVER provided by Citrix Systems, Inc., of Fort Lauderdale, Fla.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical disks 304, physical devices 306, physical processors 308, physical memory 316, and any other component included in virtualization server 301 hardware layer 310.

Hypervisor 302 may create the one or more virtual machines 332B-332C in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating the virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute the one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments, virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include the virtual disks 326A-326C (generally virtual disk 326) and the virtual processors 328A-328C (generally virtual processor 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, the hypervisor 302 provides each virtual machine 332 with a unique view of the physical disks 304. Thus, in these embodiments, the particular virtual disk 326 included in each virtual machine 332 can be unique when compared with the other virtual disks 326.

The virtual processor 328 can be a virtualized view of the one or more physical processors 308 of the virtualization server 301. In some embodiments, the virtualized view of the physical processors 308 can be generated, provided, and managed by the hypervisor 302. In some embodiments, the virtual processor 328 has substantially all of the same characteristics of at least one physical processor 308. In other embodiments, the virtual processor 308 provides a modified view of the physical processors 308 such that at least some of the characteristics of the virtual processor 328 are different than the characteristics of the corresponding physical processor 308.

Figure 4:
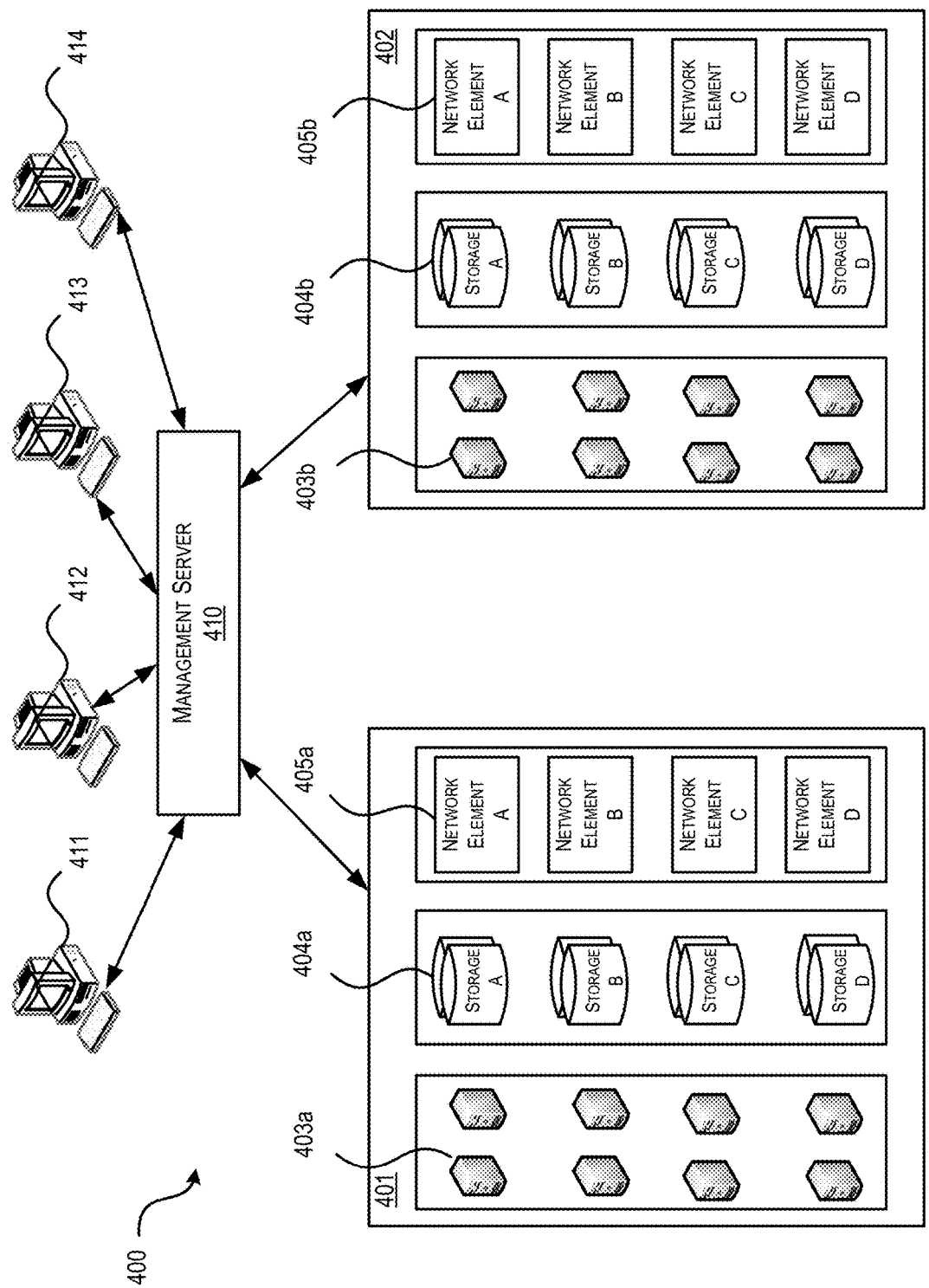
FIG. 4 depicts an illustrative cloud-based system architecture that may be used in accordance with one or more illustrative aspects described herein.

FIG. 4 depicts an illustrative cloud-based system architecture that may be used in accordance with one or more illustrative aspects described herein.

Referring to FIG. 4, an example of a cloud computing environment (or cloud system) 400 that may be used to implement one or more illustrative aspects described herein is provided. Those of skill in the art will appreciate that the specific network architecture and data processing devices used may vary and are secondary to the functionality that they provide, as further described herein.

As seen in FIG. 4, client computers 411-414 may communicate with a cloud management server 410 to access computing resources (e.g., host servers 403, storage resources 404, and network resources 405) of the cloud system 400.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computer servers 403, data storage devices 404, and network elements 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based on standalone applications) with user interfaces configured to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud system 400. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system 400 based on the client requests. For example, the management server 410 and additional components of the cloud system 400 may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud system 400 also may be configured to provide various specific services, including security systems, development environments, user interfaces, and the like.

Certain client computers 411-414 may be related, for example, different client computers creating virtual machines on behalf of the same end user, or different users affiliated with the same company or organization. In other examples, certain client computers 411-414 may be unrelated, such as client computers associated with users affiliated with different companies or organizations. For unrelated client computers, information on the virtual machines or storage of any one client computer (or user) may be hidden from other client computers (or users).

Referring now to the physical hardware layer of a cloud computing environment 400, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones 401-402, or at a separate location. Each zone 401-402 may include an internal network that interfaces with devices that are outside of the zone, such as the management server 410, through a gateway. End users of the cloud system 400 (e.g., client computers 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system 400 may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more host computer servers 403, such as the virtualization servers 301 described above, which may be configured to create and host virtual machine instances. The physical storage resources in the cloud zone 401-402 may include storage devices 404 (e.g., solid state drives (SSDs), magnetic hard disks, etc.) and other storage devices. The physical network resources in a cloud zone 401 or 402 may include one or more network elements 405 (e.g., network service providers) comprising hardware and/or software configured to provide a network service to cloud customers, such as firewalls, network address translators, load balancers, VPN gateways, DHCP routers, and the like.

The example cloud computing environment 400 shown in FIG. 4 also may include a virtualization layer (e.g., as shown in FIG. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers, i.e. the host computer servers 403, with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Rendering a Web Application in a Cloud Service.

One or more aspects of the disclosure may incorporate, be embodied in, and/or be implemented using one or more of the computer system architecture, remote-access system architecture, virtualized (hypervisor) system architecture, and/or cloud-based system architecture discussed above in connection with FIGS. 1-4.

Figure 5:
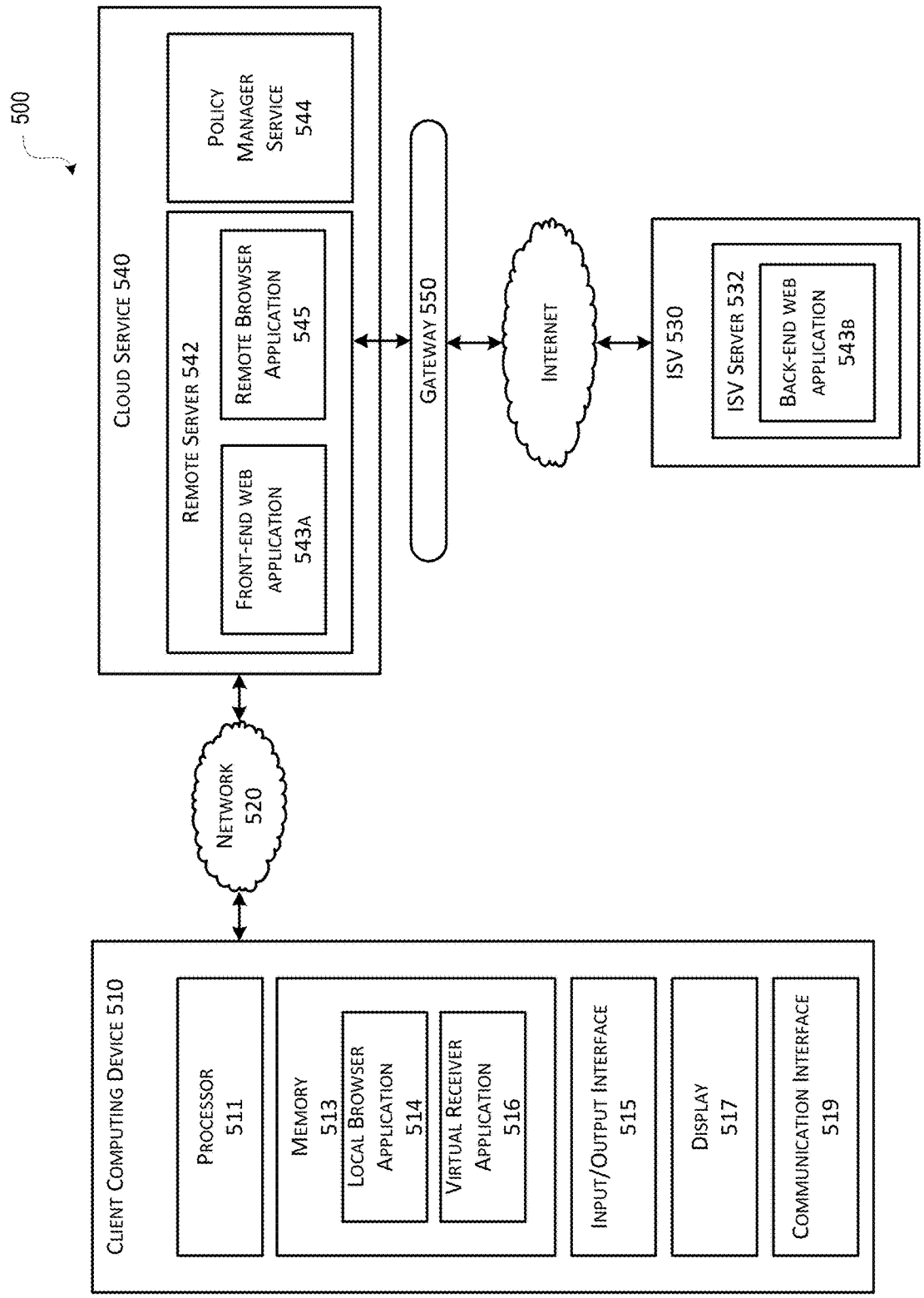
FIG. 5 depicts an illustrative computing environment for rendering a web-based application in a cloud service in accordance with one or more illustrative aspects described herein.

FIG. 5 depicts an illustrative computing environment for rendering a web-based application in a cloud service in accordance with one or more illustrative aspects described herein.

Referring to FIG. 5, a computing environment 500 is provided. The computing environment 500 may include a client computing device 510, an ISV 530, and a cloud service 540.

The client computing device 510 may be a device similar to the computing device 201, illustrated FIG. 2, and/or the client computers 411-414, illustrated in FIG. 4. The client computing device 510 may be a device such as a PC, a mobile device, a laptop computer, a tablet, a smartphone, a PDA, a notebook, a set-top box, etc. One of ordinary skill in the art will understand that the client computing device 510 is not limited to the above-noted devices, but may include other devices known now or to be developed in the future. The client computing device 510 may include a processor 511, a memory 513, an input/output interface 515, a display 517, and a communication interface 519.

The processor 511 may control overall operation of the client computing device 510 and its corresponding components.

The memory 513 may include a volatile and/or non-volatile memory. The memory 513 may store software and/or data relevant to at least one component of the client computing device 510. The software may provide instructions to the processor 511 for configuring the client computing device 510 to perform various functions and methods described herein. The memory 513 may additionally include an operating system, application programs, databases, etc. The application programs stored in the memory 513 may include a local browser application 514 and a virtual machine receiver application 516.

The local browser application 514 may provide web browsing functionality. The local browser application 514 may include a browser such as Microsoft Edge™, Microsoft Internet Explorer™, Google Chrome™, and Mozilla Firefox™. However, it should be understood by those of skill in the art, that the local browser application 514 is not limited thereto and may include other browsers.

The input/output interface 515 may be used as an interface for forwarding instructions or data, which are input into the client computing device 510 by a user or by another device. The input/output interface 515 may also be used as an interface for outputting instructions or data which are received from other components of the client computing device 510 or from another device.

The virtual machine receiver application 516 may be a thin-client or remote-display application for presenting display output generated by another application, such as by a remote browser application 545, which is remotely executing on a host server, such as a remote server 542 in the cloud service 540. The virtual machine receiver application 516 may provide the remotely generated output to a window of the local browser application 514 on the client computing device 510. The remotely generated output may be a graphical user interface (GUI). The virtual machine receiver application 516 may be designed to present the GUI via the local browser application 514, and record any user interactions occurring within the GUI. The virtual machine receiver application 516 may then transmit the user interactions occurring in the GUI back to the cloud service 540 to be forwarded to the remote server 542 and/or an ISV server 532 for processing. The virtual machine receiver application 516 may use, for example, an independent computing architecture (ICA) protocol, a remote desktop protocol (RDP), or the like.

The display 517 may be a device used to display various types of content, such as text, images, video, icons, etc.

The communication interface 519 may be used to establish communication between the client computing device 510 and other devices and elements of the computing environment 500. For example, the communication interface 519 may establish a connection to the cloud service 540 via the network 520.

The network 520 may include a LAN, a WAN, a MAN, a public network, a private network, a personal network, etc. The network 520 may be used to interconnect the client computing device 510 to the cloud service 540.

The ISV 530 may be a computing system of a software vendor which develops and sells consumer and/or enterprise software or services. The ISV may sell or otherwise offer customers access to its software or services on a subscription or software as a service (SaaS) basis. Accordingly, the user of the client computing device 510 may subscribe to the ISV 530 for use of a particular software, such as a web application 543, hosted by the ISV 530. In accordance with an aspect of this disclosure, the ISV 530 may host a portion of a web application 543, e.g., a rich internet application, on an ISV server 532 of the ISV 530. The portion of the web application 543 hosted at the ISV server 532 may be a server-side or back-end portion of the web application 543b, such as a business layer and a data layer of the web application 543. The business layer may support the underlying business logic, rules, and processing used by the web application 543. The data layer may provide the web application 543 access to underlying data stores.

The cloud service 540 may be similar to the cloud system 400 illustrated in FIG. 400. The cloud service 540 may host a remote server 542 and a policy manager service 544. The remote server 542 may be similar to the host servers 403 illustrated in FIG. 4. The remote server 542 may further be a virtualization server, such as the virtualization server 301 illustrated in FIG. 3, which may be configured to create and host virtual machine instances.

In accordance with an aspect of this disclosure, the remote server 542 may host at least a portion of the web application 543 and the remote browser application 545.

That is, the ISV 530 may upload a client-side or front-end portion of the web application 543a to the remote server 542. The front-end portion of the web application 543a may be a presentation layer of the web application 543. The front-end portion of the web application 543a, hosted by the remote server 542 in the cloud service 540, may communicate with the back-end portion of the web application 543b, hosted by the ISV server 532. The front-end portion of the web application 543a and the back-end portion of the web application 543b may communicate with each other via a variety of different protocols and methods, including via Representational State Transfer (REST) API calls or Simple Object Access Protocol (SOAP) based calls.

The remote browser application 545 may be one or more instances of a web browser application, such as Microsoft Edge™, Microsoft Internet Explorer®, Google Chrome™, and Mozilla Firefox™ executing on the remote server 542.

A session may be initiated at the remote server 542, in response to a request by the client computing device 510 to execute the web application 543, and the remote browser application 545 may be launched in the session. Accordingly, the front-end portion of the web application 543a may be executed and the remote server 542 may determine a browser which supports the web application 543 in which to render the output of the front-end portion of the web application 543a. The remote browser application 545 may use policy information maintained by the policy manager service 544 of the cloud service 540 to determine the supported browser. The remote browser application 545 may execute the front-end of the web application 543a in the determined remote browser application 545. The output, such as a GUI, rendered by the remote browser application 545 is transmitted to the virtual machine receiver application 516 in the client computing device 510 to be presented in a window of the local browser application 514 executing in the client computing device 510.

Accordingly, the remote browser application 545 may be used seamlessly by the client computing device 510 to provide access to natively unsupported web applications and content. Use of the remote browser application 545 by the client computing device 510 may also enhance and/or otherwise provide improved security at the client computing device 510.

The policy manager service 544 may be a server providing device policy manager services, application policy manager services, data policy manager services, and the like. That is, the policy manager service 544 may manage policies defined by the ISV 530, the cloud service 540, or by an enterprise (not shown) associated with the client computing device 510 for devices communicating with the cloud service 540, applications operating on the cloud service 540, and data residing on or otherwise associated with the ISV 530, the cloud service 540, or an enterprise associated with the client computing device 510. For example, in accordance with an aspect of this disclosure, the policy manager service 544 may maintain policy information relating to a specific version of the front-end portion of the web application 543a required by the back-end portion of the web application 543b or by other resources used by the front-end portion of the web application 543a. In accordance with another aspect of this disclosure, the policy manager service 544 may maintain policy information relating to a browser application which is compatible with the front-end portion of the web application 543a. The policy information maintained by the policy manager service 544 may be used by the client computer device 510, the ISV server 532, or the remote server 542. While the policy manager service 544 is illustrated as being located at the cloud service 540, the policy manager service 544 may alternatively be located at the ISV 530.

The ISV 530 may be connected to the cloud service 540 via a gateway 500. For example, the gateway 550 may be a NetScaler gateway, a cloud service gateway, a VPN gateway, etc. The gateway 500 may serve as a secure channel for communicating between the cloud service 540 and the ISV 530. Alternatively, the cloud service 540 and the ISV 330 may communicate via a VPN.

Figure 6:
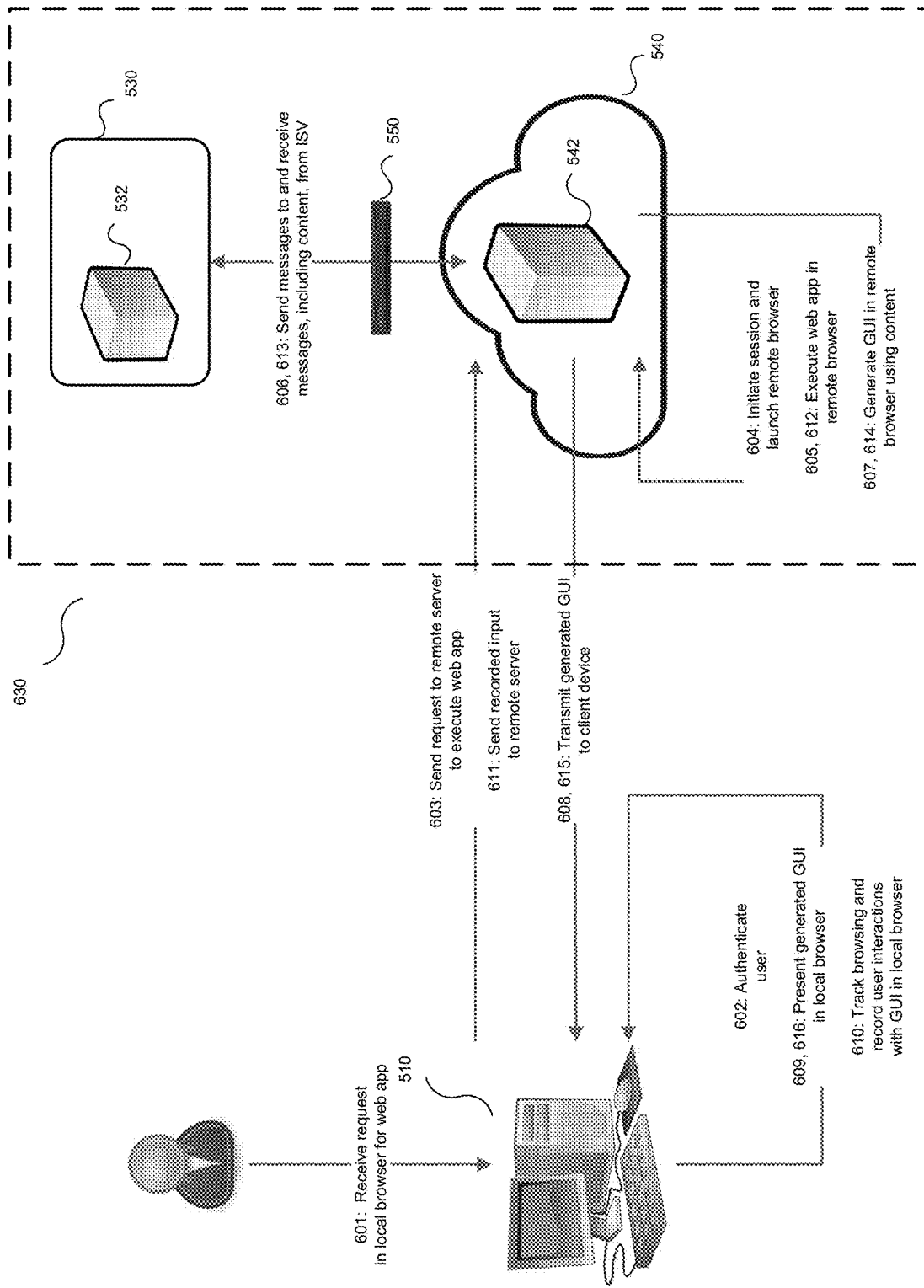
FIG. 6 depicts an illustrative event sequence for rendering a web-based application in a cloud service in accordance with one or more illustrative aspects described herein.

FIG. 6 depicts an illustrative event sequence for rendering a web-based application in a cloud service in accordance with one or more illustrative aspects described herein.

Referring to FIG. 6, the sequence of events described herein may be executed by the computing environment illustrated in FIG. 5.

First, at step 601, the client computing device 510 may receive a request to execute the web application 543 when, for example, a user of the client computing device 510 enters a uniform resource locator (URL) into an address field of the local browser application 514 or when another application executing on the client computing device 510, or executing externally, attempts to access the local browser application 514 to execute the web application 543. In this case, the client computing device 510 may determine to send the request to execute the web application 543 to the remote server 542 which hosts at least the front-end portion of the web application 543a. The client computing device 510 may make the determination to send the request to the remote server 542 based on policy information. The policy information may be obtained from the policy manager service 544 in the cloud service 540 via push or pull-based mechanisms. Alternatively, the policy manager services 544 may be located at the ISV 530. The client computing device 510 may store the policy information in the memory 513 of the client computing device 510. As another alternative, the policy information may be pre-stored in the memory 513 of the client computing device 510 and may be directly accessed by the client computing device 510 therefrom.

The client computing device 510 may determine to send the request to the remote server 542 when the policy information indicates that the requested web application 543 is not supported at the client computing device 510. The policy information may indicate that the web application 543 is not supported at the client computing device 510 for a variety of reasons. For example, when the local browser application 514 does not support a deprecated web application 543 or a deprecated feature of the web application 543 the policy information may indicate that the web application 543 is not supported—such as when the local browser application 514 does not support a Microsoft Silverlight™ application, Adobe Flash™ content, or Oracle Java™ browser plugins due to deprecation. As another example, when a specific version of the front-end portion of the web application 543 is required by the back-end portion of the web application 543b, the policy information may indicate that the web application 543 is not supported. One of ordinary skill in the art would recognize that the policy information may indicate that the web application is not supported at the client computing devices 510 for reasons other than those listed herein. The policy information may indicate the web applications 543 which are not supported at the client computing device 510 by maintaining a list of URLs that are to be accessed remotely instead of locally. The policy information may further indicate additional information about the web applications 543 which are not supported at the client computing device 510.

Next, at step 602, the client computing device 510 may authenticate the user of the client computing device 510. The client computing device 510 may authenticate the user using one or more of a variety of methods—such as validating a username and password entered by the user, biometric input provided by the user, and/or other input provided by the user. The client computing device 510 may cache one or more authentication credentials linked to and/or otherwise associated with the user. In caching the one or more authentication credentials associated with the user, the client computing device 510 may store in a keychain and/or otherwise cache one or more single sign-on (SSO) credentials linked to a user account of the cloud service 540 associated with the user. The SSO credentials may be usable by the client computing device 510 to enable the client computing device 510 to login to the cloud service 540 to access the remote server 542 and request the remote server 542 to execute the web application 543. The cloud service 540 may establish a connection with the ISV 530 via the gateway 550 and may use the SSO credentials to access the user's account at the ISV 530. The ISV 530 may alternatively require a separate authentication process for access thereto.

Next, at step 603, after the client computing device 510 determines that web application 543 is not supported at the client computing device 510 and the user has been successfully authenticated, the client computing device 510 may send, via the communication interface 519, a request to the remote server 542 for the remote browser 542 to execute the web application 543 instead of the client computing device 510 executing the web application 543. The request may include a parameterized URL, supplying for example, the requested web application 543, a path to the remote browser application 545, commands for executing the remote browser application 545 in a specific mode, e.g., in a kiosk mode, and any other necessary data. The request may further include received policy information.

Next, at step 604, in response to receiving the request to execute the web application 543, the client computing device 510 may control the remote server 542 to initiate, at the remote server 542, a session linked to the user account of the user of the client computing device 510.

The client computing device 510 may then control the remote server 542 to determine a specific version of the front-end portion of the web application 543a and a specific instance of the remote browser application 545 in which to execute the web application 543. The determinations may be made based on policy information.

The remote server 542 may obtain the policy information from the policy manager service 544 in the cloud service 540. Alternatively, the policy manager service 544 may be located at the ISV 530 and, in this case, the remote server 542 may obtain the policy information therefrom. Alternatively still, the client computing device 510 may store the policy information in a memory 513 of the client computing device 510 and may transmit the policy information to the remote server 542 with the request to execute the web application 543. The remote server 542 may store the policy information in a memory of the remote server 542.

The client computing device 510 may then control the remote server 542 to launch an instance of the remote browser application 545 in the remote session. The client computing device 510 may control the remote server 542 to launch an instance of a specific remote browser application 545 (such as Microsoft Internet Explorer™, Google Chrome™, etc.) which is determined to be compatible with the first portion of the web application 543a. The remote server 542 may determine the specific remote browser application 545 to launch based on policy information. The policy information may be obtained as noted above.

Next, at step 605, the client computing device 510 may control the remote server 542 to execute the web application 543 by executing the determined front-end portion of the web application 543a in the determined remote browser application 545.

Next, at step 606, in executing the web application 543, the client computing device 510 may control the remote server 542 to connect ISV server 532 hosting the back-end portion of the web application 543b. The front-end portion of the web application 543a may send a message to the back-end portion of the web application 543b requesting processing and/or content. The back-end portion of the web application 543b may perform the processing and may send a message, including the content, to the front-end portion of the web application 543a. The messages may be sent via a variety of different protocols and methods, including via Representational State Transfer (REST) API calls or Simple Object Access Protocol (SOAP) based calls.

Next, at step 607, in executing the web application 543, the client computing device 510 may further control the remote server 542 to generate, using the front-end portion of the web application 543a, a GUI based on the content sent from the back-end portion of the web application 543b. The remote server 542 may render the GUI, together with the content, in the remote browser application 545 on the remote server 542.

Next, at step 608, the client computing device 510 may control the remote server 542 to transmit, to the client computing device 510, the graphics associated with the GUI (together with any content displayed in the GUI) output to the remote browser application 545. The GUI may be, for example, a static page, a dynamic page, an animation, or the like.

Next, at step 609, in response to receiving the GUI graphics, the client computing device 510 may present the received GUI graphics to the local browser application 514 executing on the client computing device 510 for display on a window of the local browser application 514. The GUI displayed in the local browser application 514 may appear the same as or similar to the GUI rendered in the remote browser application 545. For example, the local browser application 514 may display user interface elements, controls, and/or other content associated with the local browser application 514 (e.g., tab listing, back button, forward button, and/or other elements) as well as the GUI rendered at the remote browser application 545 and transmitted to the client computing device 510. In this way the web application 543, which is unsupported by the client computing device 510, is able to be rendered in the local browser application 514 using the GUI generated at the remote server 542 by the remote browser application 545.

Next, at step 610, the client computing device 510 may track browsing activity and record interactions with the GUI displayed in the local browser application 514. For example, the client computing device 510 may track browsing activity by maintaining a stack of browsing transitions associated with browsing activity. As such, the client computing device 510 may track and/or store information identifying pages accessed and/or transitions between pages, including local browsing activity in the local browser application 514 and remote browsing activity in the remote browser application 545. The client computing device 510 may maintain such a stack of browsing transitions to enable backward and/or forward navigation functionality, history tracking functionality, and/or other functionality in the local browser application 514 and/or in the remote browser application 545. Alternatively or additionally, such a stack of browsing transitions may be maintained on the remote server 542.

The client computing device 510 may record interactions with the GUI when an input is received in the GUI displayed in the local browser application 514. Such input may, for example, include a selection of a link included in the GUI displayed in the local browser application 514, an interaction with a form or other control included in the GUI displayed in the local browser application 514, an interaction with some other element included in the GUI displayed in the local browser application 514, etc. Accordingly, when such an input interacting with the GUI displayed in the local browser application 514 is received, the client computing device 510 may update the stack of browsing transitions based on the received input. For example, if the input includes the selection of a link and/or a transition to a new page associated with the link, the client computing device 510 may update the stack of browsing transitions to include information identifying the selection of the link and/or the transition to the new page associated with the link.

Next, at step 611, the client computing device 510 may send, to remote server 542, via the communication interface 519, the input interacting with the GUI displayed in the local browser application 514.

Next, at step 612, the client computing device 510 may control the remote server 542 to re-execute the web application 543 based on the received input interacting with the GUI displayed in the local browser application 514. Step 612 may be similar to step 605.

Next, at step 613, in re-executing the web application 543, the client computing device 510 may control the remote server 542 to connect to the ISV server 532 hosting the back-end portion of the web application 543b to obtain any new content associated with the web application 543 based on the received input. To this end, the front-end portion of the web application 543a may send a message to the back-end portion of the web application 543b requesting processing and/or new content based on the received input. The back-end portion of the web application 543b may perform the processing and may send a message, including the new content, to the front-end portion of the web application 543a. Step 613 may be similar to step 606.

Next, at step 614, in executing the web application 543, the client computing device 510 may further control the remote server 542 to generate, using the front-end portion of the web application 543a, an updated GUI based on the new content sent from the back-end portion of the web application 543b. The remote server 542 may render the updated GUI, together with the new content, in the remote browser application 545 on the remote server 542. Step 614 may be similar to step 607.

Next, at step 615, the client computing device 510 may control the remote server 542 to transmit, to the client computing device 510, the graphics associated with the updated GUI (together with any new content displayed in the GUI) output to remote browser application 545. The updated GUI may be, for example, a static page, a dynamic page, an animation, or the like. Step 615 may be similar to step 608.

Next, at step 616, in response to receiving the updated GUI, the client computing device 510 may present the received updated GUI graphics to the local browser application 514 executing on the client computing device 510 for display on a window of the local browser application 514. Step 616 may be similar to step 609.

The client computing device 510 may repeat steps 610-616 until the local browser application 514 is terminated or no further inputs are received in the GUI displayed in the local browser application 514.

Figure 7A:
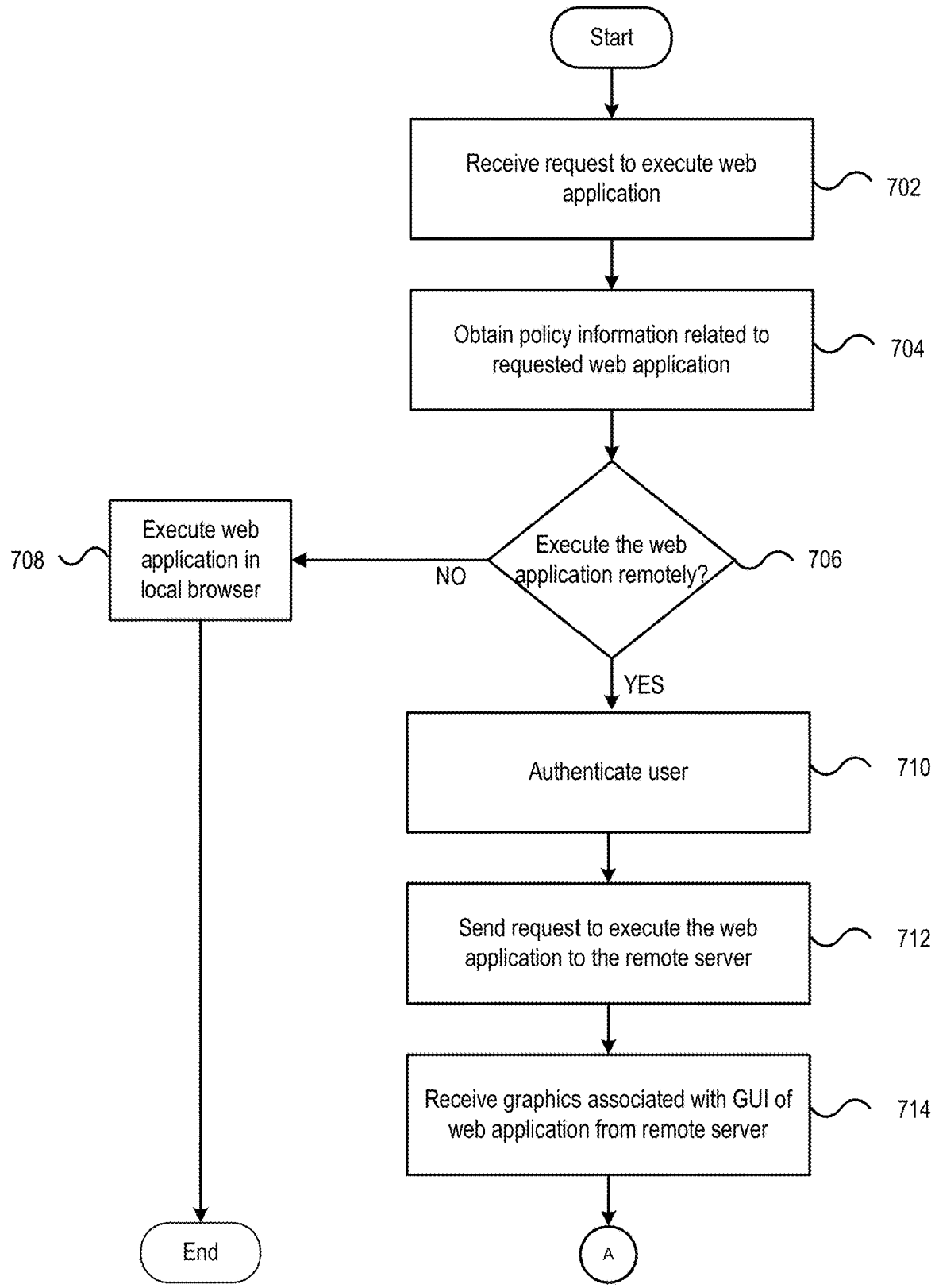
FIGS. 7A-7B depict a flowchart of an illustrative method of a client computing device for rendering a web-based application in a cloud service in accordance with one or more illustrative aspects described herein.
Figure 7B:
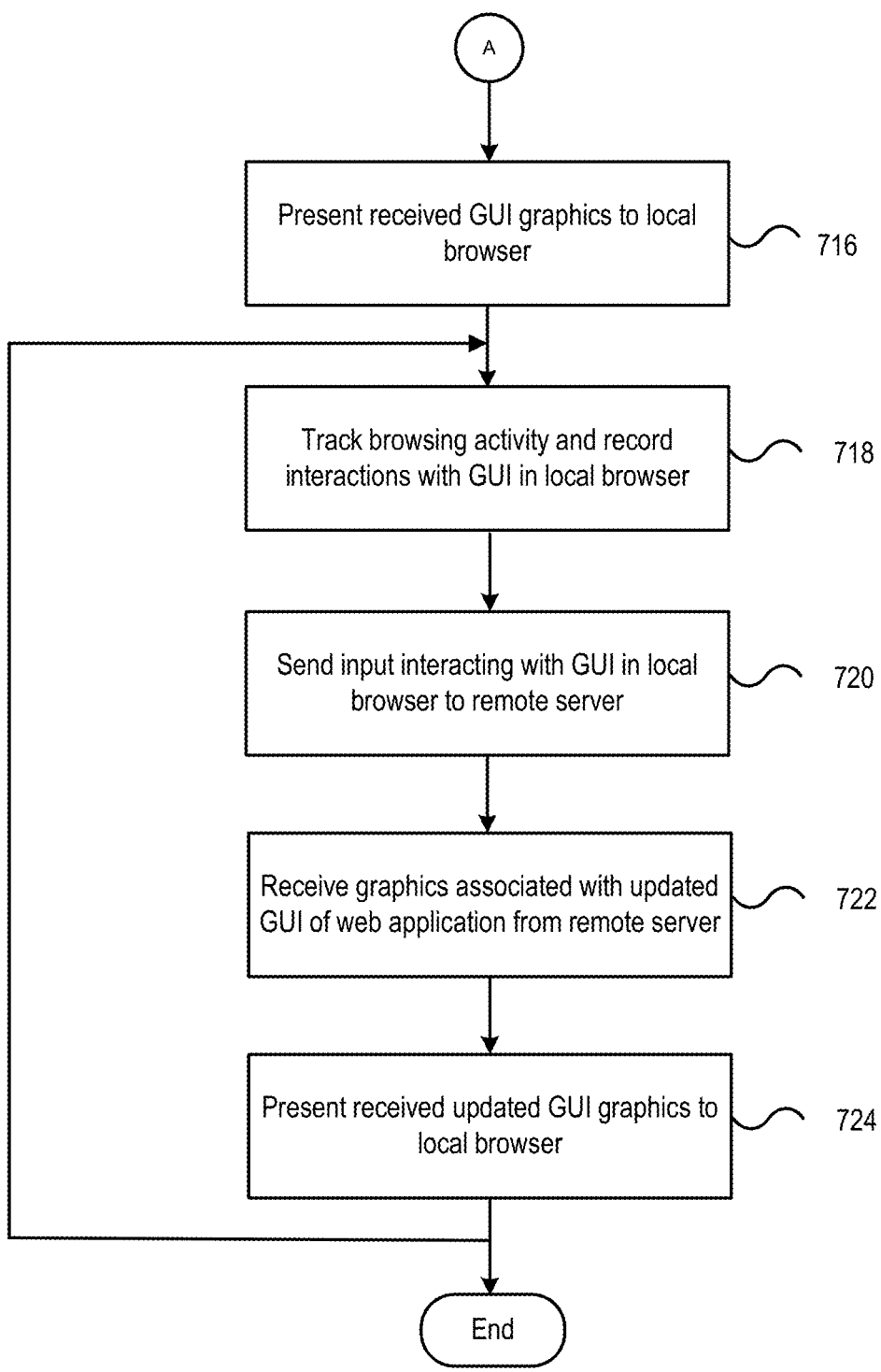

FIGS. 7A-7B depict a flowchart of an illustrative method of a client computing device for rendering a web-based application in a cloud service in accordance with one or more illustrative aspects described herein.

Referring to FIGS. 7A-7B, the method described herein relates to a method of a client computing device and may be executed by the computing environment illustrated in FIG. 5.

At step 702, the client computing device 510 may receive a request to execute the web application 543 in the local browser application 514. The request may be initiated in the local browser application 514 by a user or by another application executing on the client computing device 510, or executing externally, and attempting to access the local browser application 514 to execute the web application 543.

At step 704, the client computing device 510 may obtain policy information related to the requested web application 543. The policy information may be obtained in the manner described with respect to FIG. 6.

At step 706, based on the obtained policy information, the client computing device 510 may determine whether to execute the web application 543 locally, by the client computing device 510, or remotely, by the remote server 542 hosting at least a portion of the web application 543. The client computing device 510 may determine to execute the web application 543 remotely, when the policy information indicates that the requested web application 543 is not supported at the client computing device 510. The policy information may indicate that the web application 543 is not supported at the client computing device 510 in the manner described with respect to FIG. 6.

If the client computing device 510 determines not to execute the web application 543 remotely, then at step 708, the client computing device 510 executes the web application 543 in the local browser application 514 at the client computing device 510.

Otherwise, if the client computing device 510 determines to execute the web application 543 at the remote server 542, then at step 710, the client computing device 510 may authenticate the user of the client computing device 510 for access to the cloud service 540 and/or the ISV 530. The user may be authenticated in the manner described with respect to FIG. 6.

At step 712, in response to successful authentication of the user, the client computing device 510 may send, via the communication interface 519, a request to the remote server 542, which hosts the front-end portion of the web application 543*a*, to execute the web application 543.

At step 714, in response to the request to the remote server 542 to execute the web application 543, the client computing device 510 may receive, from the remote server 542, graphics associated with a GUI of the web application 543 which has been executed and rendered in the remote browser application 545 on the remote server 542.

At step 716, in response to receiving the GUI graphics, the client computing device 510 may present the received GUI graphics to the local browser application 514 executing on the client computing device 510 for display on a window of the local browser application 514.

At step 718, the client computing device 510 may track browsing activity and record interactions with the GUI displayed in the local browser application 514. For example, the client computing device 510 may track browsing activity by maintaining a stack of browsing transitions associated with browsing activity and may record input interactions, such as the selection of a link or input of data, received in the GUI displayed in the local browser application 514.

At step 720, the client computing device 510 may send, to the remote server 542, via the communication interface 519, the input interacting with the GUI displayed in the local browser application 514.

At step 722, in response to sending the inputs interacting with the GUI to the remote server 542, the client computing device 510 may receive, from the remote server 542, graphics associated with an updated GUI of the web application 543, which has been re-executed in the remote browser application 545 based on the sent inputs and then output again to remote browser application 545.

At step 724, in response to receiving the updated GUI graphics, the client computing device 510 may present the received updated GUI graphics to the local browser application 514 executing on the client computing device 510 for display on a window of the local browser application 514.

The client computing device 510 may repeatedly execute steps 718-724 until the local browser application 514 is terminated or no further input is received in the GUI graphics in the local browser application 514.

In this way the web application 543, which is unsupported by the client computing device 510, is able to be rendered in the local browser application 514 by executing the web application at the remote server 542 and using a GUI generated at the remote server 542 by the remote browser application 545 for display in the local browser application 514.

Figure 8A:
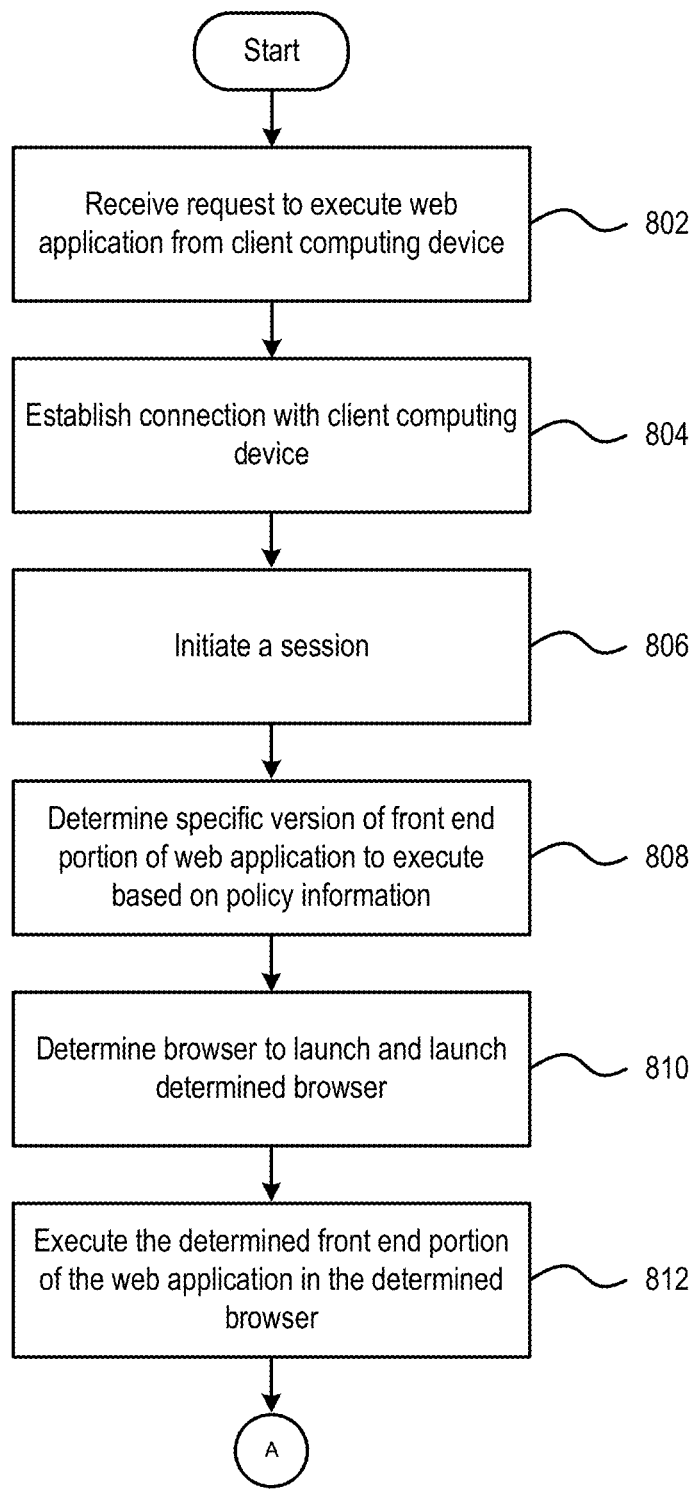
FIGS. 8A-8C depict a flowchart of an illustrative method of a remote server for rendering a web-based application in a cloud service in accordance with one or more illustrative aspects described herein.
Figure 8B:
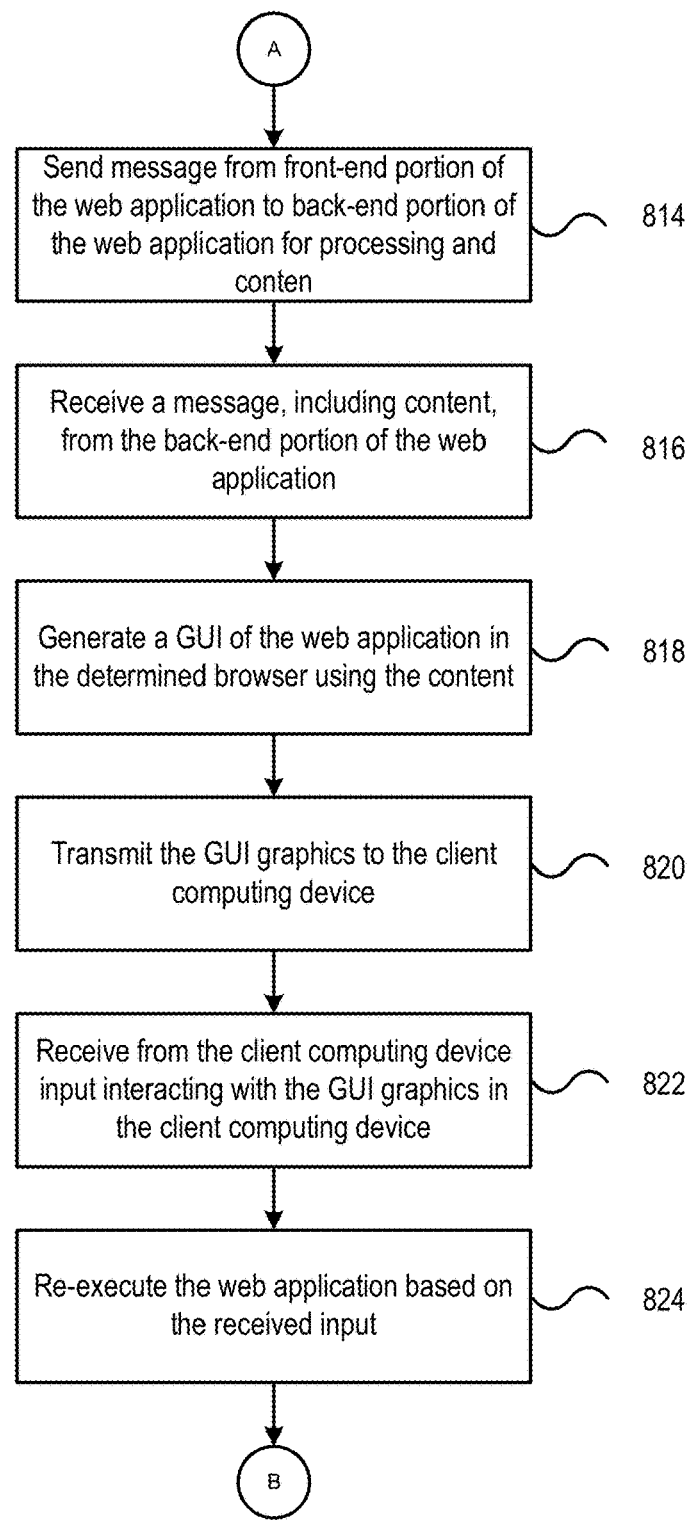
Figure 8C:
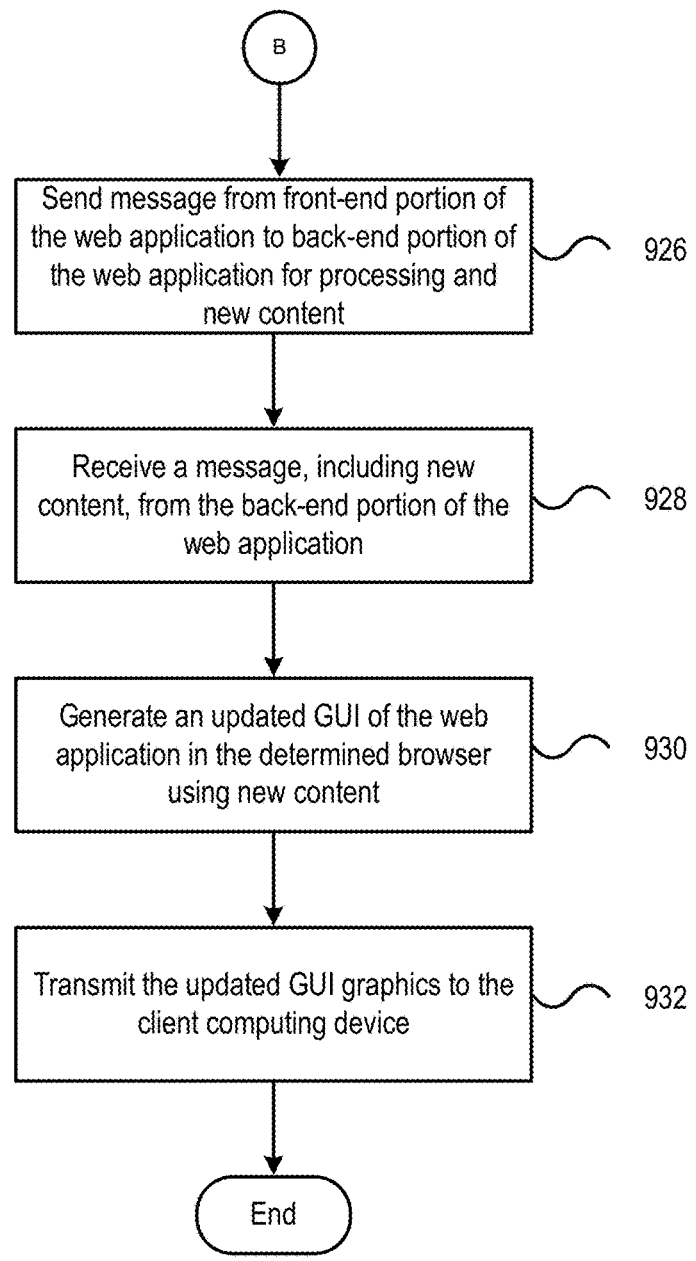

FIGS. 8A-8C depict a flowchart of an illustrative method of a remote server for rendering a web-based application in a cloud service in accordance with one or more illustrative aspects described herein.

Referring to FIGS. 8A-8C, the method described herein relates to a method of a remote server and may be executed by the computing environment illustrated in FIG. 5.

At step 802, the remote server 542 may receive, from the client computing device 510, a request to execute the web application 543, where at least the front-end portion of the web application 543*a* is hosted on the remote server 542.

At step 804, the remote server 542 may establish a connection with the client computing device 510 upon successfully authenticating a user of the client computing device 510.

At step 806, in response to receiving the request to execute the web application 543, the remote server 542 may initiate a session linked to the user account of the user of the client computing device 510.

At step 808, the remote server 542 may determine a specific version of the front-end portion of the web application 543*a* to execute based on obtained policy information. The remote server 542 may obtain the policy information in the manner described with respect to FIG. 6.

At step 810, the remote server 542 may launch an instance of a specific remote browser application 545 (such as Microsoft Internet Explorer™, Google Chrome™, etc.) which is determined to be compatible with the first portion of the web application 543*a*, based on the policy information.

At step 812, the remote server 542 may execute the web application 543 by executing the determined front-end portion of the web application 543 in the determined remote browser application 545.

At step 814, the remote server 542 may connect to the ISV server 532 hosting the back-end portion of the web application 543*b*. The front-end portion of the web application 543*a* may send a message to the back-end portion of the web application 543*b* requesting processing and/or content.

At step 816, the remote server 542 may receive a message, including the content, from the back-end portion of the web application 543*b*.

At step 818, the remote server 542 may generate, using the front-end portion of the web application 543*a*, a GUI based on the content received from the back-end portion of the web application 543*b*. The remote server 542 may render the GUI, together with the content, in the remote browser application 545.

At step 820, the remote server 542 may transmit, to the client computing device 510, the graphics associated with the GUI (together with any content displayed in the GUI) output to the remote browser application 545.

At step 822, the remote server 542 may receive, from the client computing device 510, input interacting with the GUI displayed in the local browser application 514.

At step 824, the remote server 542 may re-execute the web application 543 based on the received input interacting with the GUI displayed in the local browser application 514.

At step 826, the remote server 542 may connect to the ISV server 532 hosting the back-end portion of the web application 543*b* and the front-end portion of the web application 543*a* may send a message to the back-end portion of the web application 543*b* requesting processing and/or new content based on the received input.

At step 828, in response, the back-end portion of the web application 543*b* may send the front-end portion of the web application 543*a* a message including the new content.

At step 830, the remote server 542 may generate, using the front-end portion of the web application 543*a*, an updated GUI based on the new content received from the back-end portion of the web application 543*b*. The remote server 542 may render the updated GUI, together with the new content, in the remote browser application 545.

At step 832, the remote server 542 may transmit, to the client computing device 510, the graphics associated with the updated GUI (together with any new content displayed in the GUI) output to remote browser application 545.

Accordingly, various aspect of the disclosure describe novel ways of rendering a web application virtually by hosting at least a part of the web application in a cloud service and executing the web application in the cloud for access by a remote client device. The part of the web application that is hosted in the cloud may be a front end portion, while the remaining sensitive parts, such as the back-end portion, may be located at a separate secure location such as an ISV. This approach provides the flexibility to choose where to host the various parts of a web application without having to create additional network access rules and without having to deploy VPN solutions. Further, improved performance can be achieved in various geographical locations by hosting the front end portion of the web application in a content delivery network (CDN). Alternatively, the geographic location of the cloud service where the web application is rendered can be chosen to be close to the location of where the back-end portion of the web application is hosted for improved throughput. Further, as the deprecation of certain software forces users to access affected web applications using only certain web browsers which still support the deprecated web applications, according to aspects described herein, a user may access the same deprecated web application via any local browser by having the web application executed virtually in a remote browser hosted in a cloud service. Accordingly, issues of application and software incompatibility may be solved.

Although the subject matter has been described in language specific to structural features and/or methodological acts, it is to be understood that the subject matter defined in the appended claims is not necessarily limited to the specific features or acts described above. Rather, the specific features and acts described above are provided as some example implementations of the following claims.

What is claimed is:

1. A method comprising:
receiving, by a remote server, an indication of a request to execute a web application at a client browser application executing at a client device;
in response to the indication of the request to execute the web application at the client device:
determining a version of a back-end portion, of the web application, installed at a different server from the remote server; and
determining, based on the determined version of the back-end portion, a version of a front-end portion of the web application to execute, wherein the front-end portion is installed at the remote server;
causing the determined version of the front-end portion of the web application to output a graphical user interface of the web application using a remote browser application hosted by the remote server; and
sending, to the client device and for display in the client browser application, a user interface corresponding to the graphical user interface of the web application output using the remote browser application.

2. The method of claim 1, wherein the front-end portion of the web application communicates with the back-end portion of the web application via application program interface (API) calls.

3. The method of claim 1, wherein causing the determined version of the front-end portion of the web application to output the graphical user interface of the web application comprises:

executing, in the remote browser application, the determined version of the front-end portion of the web application; and
generating, based on the graphical user interface output using the remote browser application and for display in the client browser application, the user interface of the web application.

4. The method of claim 1, further comprising:
receiving policy information; and
determining based on the received policy information, a remote browser application, of a plurality of remote browser applications hosted by the remote server, that is compatible with the web application,
wherein causing the determined version of the front-end portion of the web application to output the graphical user interface of the web application comprises causing the determined version of the front-end portion of the web application to output the graphical user interface of the web application using the determined remote browser application.

5. The method of claim 1, further comprising:
receiving policy information,
wherein determining, the version of the front-end portion of the web application to execute in the remote browser application is further based on the received policy information.

6. The method of claim 1, wherein receiving the indication of the request to execute the web application at the client browser application comprises:
receiving, from the client device, a parameterized uniform resource location (URL) comprising information indicating at least one of: the web application, an address of the remote browser application, a command for executing the remote browser application in a specific mode, and policy information.

7. The method of claim 1, wherein the remote server is hosted by a cloud service.

8. The method of claim 1, wherein the remote server is hosted by a content delivery network.

9. A method comprising:
receiving, by a client device, a request to execute a web application at a local browser application executing at the client device;
determining, in response to the request, to execute the web application using a remote browser application executing at a remote server;
determining a version of a back-end portion of the web application installed at a second server different from the remote server;
determining, based on the version of the back-end portion of the web application, a version of a front-end portion of the web application to execute using the remote browser application, wherein the front-end portion of the web application is installed at the remote server; and
sending, to the remote server, a request to execute the determined version of the front-end portion of the web application using the remote browser application.

10. The method of claim 9, wherein sending the request comprises sending a parameterized uniform resource location (URL) comprising information indicating at least one of: the determined version of the front-end portion of the web application, an address of the remote browser application, a command for executing the remote browser application, and policy information.

11. The method of claim 9, further comprising:
retrieving policy information; and determining, based on the policy information, one of a plurality of remote browser applications to use to execute the determined version of the front-end portion of the web application,
  wherein sending the request comprises sending information indicating the remote browser application to execute.

12. The method of claim 9, wherein the request comprises instructions for the remote server to connect to the second server.

13. The method of claim 9, further comprising:
  receiving, from the remote server, a user interface corresponding to a graphical user interface of the determined version of the front-end portion of the web application executing on the remote browser application; and
  outputting, using the local browser application, the received user interface.

14. The method of claim 13, further comprising:
  recording user interactions with the user interface output to the local browser application.

15. The method of claim 14, further comprising:
  sending, to the remote server, the user interactions;
  receiving, based on the user interactions, an updated user interface corresponding to the graphical user interface of the determined version of the front-end portion of the web application executing on the remote browser application; and
  outputting, using the local browser application, the updated user interface.

16. The method of claim 9, wherein determining to execute the web application using the remote browser application is based on detecting a failure by the client device to launch the requested web application at the local browser application.

17. The method of claim 9, wherein determining to execute the web application using the remote browser application is based on receiving information indicating: that the requested web application is unsupported at the client device or that a specific version of the requested web application is required.

18. A system comprising:
  a client device comprising:
    a first processor; and
    a first memory storing a local browser application; and
  a remote server comprising:
    a second processor; and
    a second memory storing a remote browser application, and a front-end portion of a web application,
  wherein the first processor of the client device is configured to:
    receive a request to execute the web application at the local browser application;
    determine, in response to the request, to execute the web application using the remote browser application;
    determine a version of a back-end portion of the web application installed at a second server different from the remote server;
    determine, based on the version of the back-end portion of the web application, a version of the front-end portion of the web application to execute using the remote browser application; and
    send, to the remote server, a request to execute the determined version of the front-end portion of the web application using the remote browser application, and
  wherein the second processor of the remote server is configured to:
    receive, from the client device, the request to execute the determined version of the front-end portion of the web application using the remote browser application;
    execute the determined version of the front-end portion of the web application using the remote browser application; and
    send, to the client device and for display in the local browser application, a user interface corresponding to a graphical user interface of the determined version of the front-end portion of the web application executing using the remote browser application.

19. The system of claim 18, wherein the first processor of the client device is further configured to:
  send the request to execute the determined version of the front-end portion of the web application by sending a parameterized uniform resource location (URL) comprising information indicating at least one of: the determined version of the front-end portion of the web application and an address of the remote browser application.

20. The system of claim 18, wherein the second processor of the remote server is further configured to:
  receive, from the client device, policy information;
  determine, based on the policy information, a remote browser application, of a plurality of remote browser applications, that is compatible with the determined version of the front-end portion of the web application; and
  execute the determined version of the front-end portion of the web application using the determined remote browser application.

* * * * *